H. F. GARDNER.
IRRIGATING VALVE.
APPLICATION FILED APR. 21, 1913.
1,140,510.
Patented May 25, 1915.
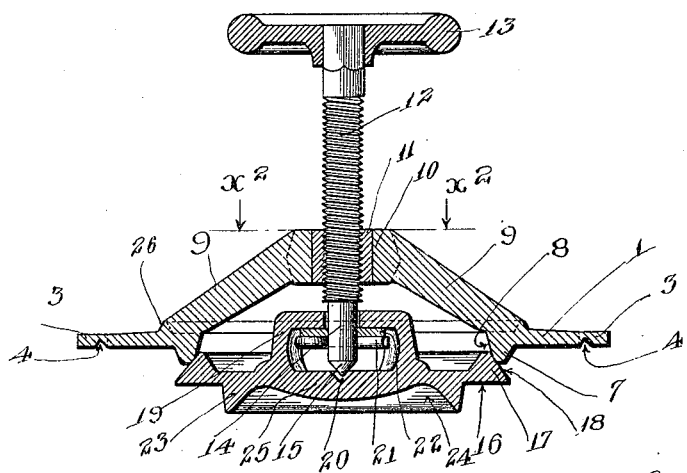
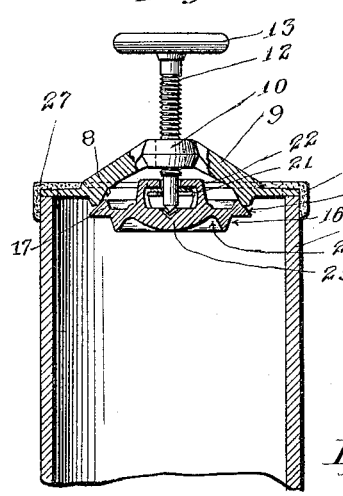
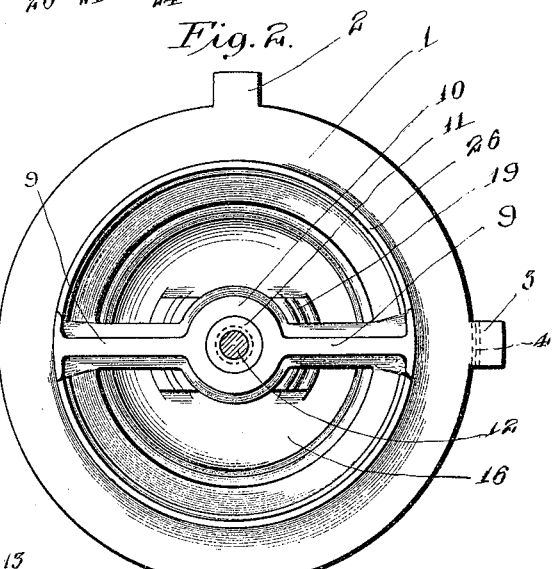
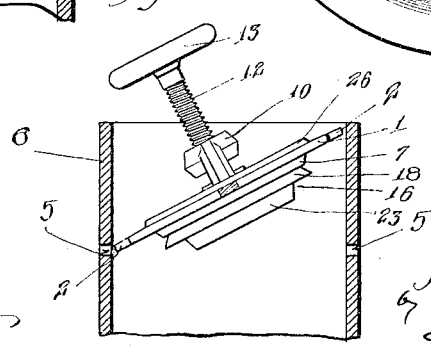
Witnesses:
Inventor
Henri F. Gardner

UNITED STATES PATENT OFFICE.

HENRI F. GARDNER, OF ORANGE, CALIFORNIA.

IRRIGATING-VALVE.

1,140,510.  Specification of Letters Patent.  Patented May 25, 1915.

Application filed April 21, 1913. Serial No. 762,755.

*To all whom it may concern:*

Be it known that I, HENRI F. GARDNER, a citizen of the United States, residing at Orange, in the county of Orange and State of California, have invented a new and useful Irrigating-Valve, of which the following is a specification.

This invention relates to irrigating valves, and one object is to cause the water pressure to act to force the valve tight against its seat when the valve is closed.

Another object is to provide a connection between the operating screw and valve, such that the valve may assume its natural position against the seat and thereby make a more perfect closure.

Another object is to provide centering means to keep the valve substantially central with the screw.

Another object is to provide removable ears to permit the valve to be located on the end of the pipe or at a point within the pipe.

Referring to the drawings: Figure 1 is a vertical section through the device. Fig. 2 is a section on line $x^2$—$x^2$, Fig. 1. Fig. 3 is a vertical section through the upper portion of a pipe, and the device in place thereon, part of the device being in elevation. Fig. 4 is a view similar to Fig. 3, showing the manner of inserting the valve in the end of a pipe.

The device comprises an annular plate 1, having several radially projecting ears 2 and 3. These ears are constructed integral with the plate 1 and the ears 3 are formed with deep grooves 4. When the device is to be secured on the end of the pipe, the ears 2 and 3 rest on the edge of the pipe as shown in Fig. 3. If the device is to be located at a point within the pipe, the ears 3 are removed by breaking them along the grooves 4 which will permit the valve to be inserted in the pipe by tipping it at an angle as shown in Fig. 4, and pushing it down until one of the ears 2 arrives at the opening 5 in the pipe 6, and when the ear 2 is thus received, it permits a sufficient lateral movement to allow the opposite ear 2 to be swung down into register with the opposite opening 5 and then a lateral movement of the plate toward the last mentioned slot brings the latter lug into the latter slot.

The plate 1 is formed with a depending flange 7 formed with a tapered valve seat 8 and a yoke 9 bridges the plate and is formed with a central eye 10 in which is a nut 11 formed of bronze or other suitable material, and screwed therein is the screw 12 with hand wheel 13 at its upper end, and having a smooth lower extension 14 with a conical pointed end 15.

16 is the valve formed with an upper annular rib 17 having a tapered outer face 18 adapted to contact with seat 8. The valve also has a pair of recessed segmental lugs 19 which receive the lower extension 14 of the screw 12 loosely, and the valve is also formed with a conical depression 20 into which the conical end 15 of the screw 12 projects, but fits loosely therein, and ordinarily has no contact therewith. A pin 21 extends through the lower end 14 of the screw and a washer 22 is arranged between the pin 21 and lugs 19, and retains the valve on the screw 12 and acts as an abutment to receive the upward pressure from the washer 22 when the valve is screwed against its seat. On the lower face of the valve is an annular rib 23 which forms a circular recess 24 with a central convex portion 25, the purpose of which is to centralize the water pressure as much as possible and prevent the valve from tipping. Thus, when the valve is opened part way and water is rushing up through the annular opening around the outside edge of the valve, some of the water will pocket below the valve in the recess 24 and will act to steady the valve and hold it in a central position. This method of holding the valve steady while open, dispenses with the use of any side gates at the edges of the valve which would obstruct the flow of water or clog the pipe, and at the same time allows the loose connection between the valve and screw which permits the valve to freely seat naturally against the valve seat when closed, without being hampered or restrained by the screw. The plate 1 is also provided with an annular rib 26 on its upper face which forms a wall to retain the cement 27 from flowing over the inner edge of the plate 1, and also more securely locks the plate in position by providing an abutment for the cement. Fig. 3 shows the manner of cementing the valve in position on the end of the pipe 6.

This construction which centralizes the pressure prevents side movement or tipping of the valve and causes the valve to seat more perfectly in closing, and when closed, the water pressure holds the valve securely against its seat.

What I claim is:

1. In an irrigation valve, a seat adapted to rest within an irrigation pipe, a loosely mounted valve below said seat, and means for enabling the water pressure to act upon the valve to center the valve.

2. In an irrigation valve, a seat adapted to rest within an irrigation pipe, a screw, a support for the screw, a nut for said screw, a valve loosely mounted on said screw below the seat and adapted to be moved away from and drawn toward said seat by said screw, and means for enabling the water pressure to act upon the valve to center the valve.

3. In an irrigation valve, a seat adapted to rest within an irrigation pipe, a loosely mounted valve movable below the seat and adapted to rest against said seat, said valve provided with a pocket on its under side, having a convex wall against which the water in the pipe is adapted to act to center the valve.

4. In an irrigation valve, a seat adapted to rest within an irrigation pipe, a loosely mounted valve movable below said seat and adapted to rest thereagainst, said valve provided with a pocket on its under side having diverging walls against which the water is adapted to act to center the valve.

In testimony whereof, I have hereunto set my hand at Los Angeles, California, this 15th day of April, 1913.

HENRI F. GARDNER.

In presence of—
G. T. HACKLEY,
F. ALICE CRANDALL.